United States Patent [19]

Kondo et al.

[11] Patent Number: 4,807,040
[45] Date of Patent: Feb. 21, 1989

[54] SIGNAL PROCESSING FILTER FOR AN IMAGE PROJECTION DEVICE UTILIZING AN OIL FILM

[75] Inventors: Tatsuhiko Kondo, Machida; Kenzo Seo, Tokyo; Shinetsu Itoh, Tokyo; Masaru Kanazawa, Tokyo; Kiyotaka Okada, Tokyo, all of Japan

[73] Assignee: Nippon Hoso Kyokai, Tokyo, Japan

[21] Appl. No.: 91,757

[22] Filed: Sep. 1, 1987

[30] Foreign Application Priority Data

Sep. 2, 1986 [JP] Japan ................. 61-205108

[51] Int. Cl.⁴ .............................................. H04N 5/74
[52] U.S. Cl. ...................................... 358/233; 358/62
[58] Field of Search ............ 358/230, 231, 232, 233, 358/60, 62, 904, 234; 315/169.4

[56] References Cited

U.S. PATENT DOCUMENTS 3,044,358  7/1962  Glenn, Jr. .................... 358/62 X
3,475,760 10/1969  Carlson ....................... 358/233 X

FOREIGN PATENT DOCUMENTS 1510504  5/1978  United Kingdom .

OTHER PUBLICATIONS

Fernseh-und Kinotechnik, vol. 39, No. 5, 1985, Heidelberg Rüdigevkays "Eidophor-Projektor für Erhohte Bildqualität", pp. 231-234.

"Television Image Technique Handbook", 1980, pp. 194-1054.

Primary Examiner—James J. Groody
Assistant Examiner—E. Anne Faris
Attorney, Agent, or Firm—Antonelli, Terry & Wands

[57] ABSTRACT

A projection type image display device utilizing an oil film is disclosed, which device comprises a filter having frequency characteristics enabling reduction of the spatial frequency response in the vertical direction for an input signal having a stepwise waveform in the vertical direction to a value under those obtained by using the following formula with respect to the coordinate x of the position of the scanning line in the vertical direction;

$$f(x) = [1 + \sin(\pi \cdot x / D_O)]/2$$

where $D_O$ represents the smallest scanning line interval, outside of which adjacent scanning lines have no influences thereon, and filtering the input image signal according to those characteristics.

4 Claims, 3 Drawing Sheets

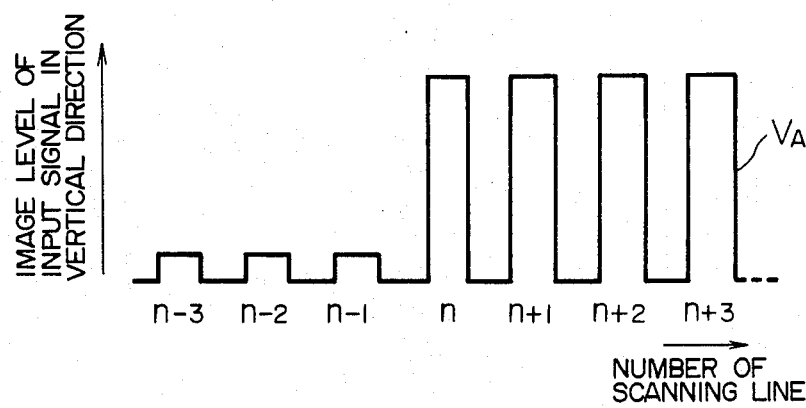
FIG. IA
(PRIOR ART)
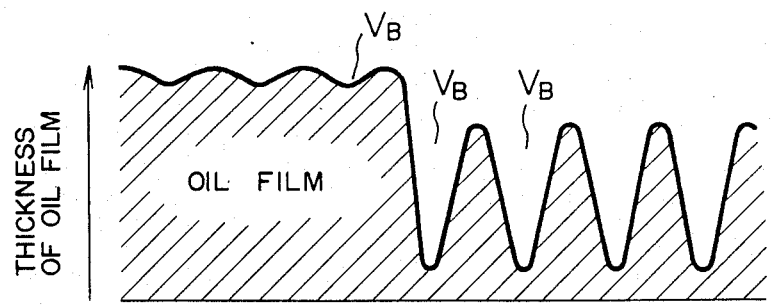
FIG. IB
(PRIOR ART)
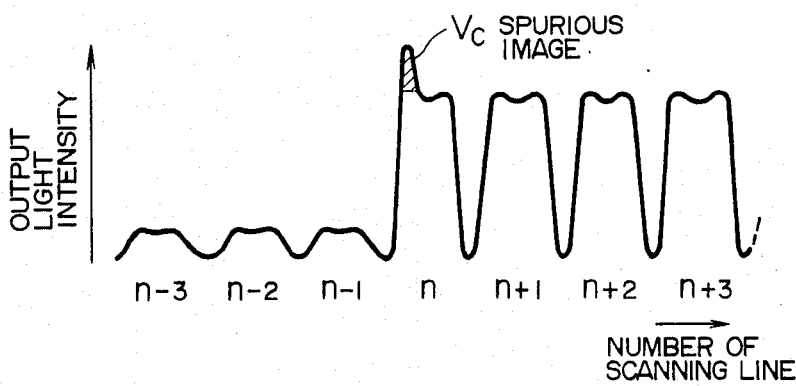
FIG. IC
(PRIOR ART)

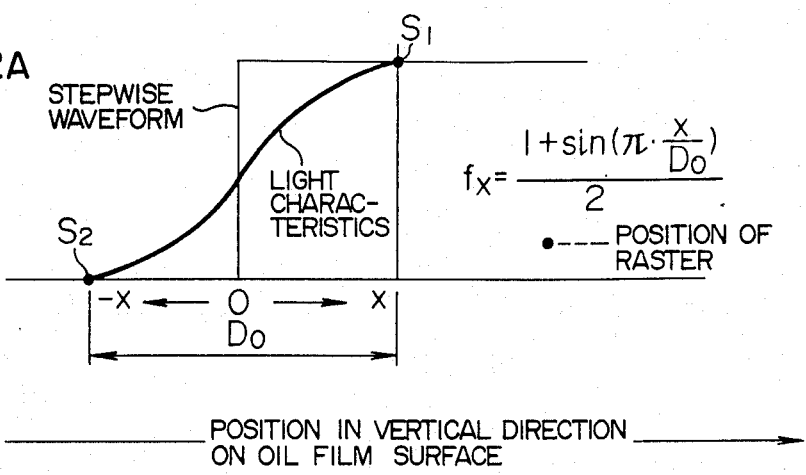
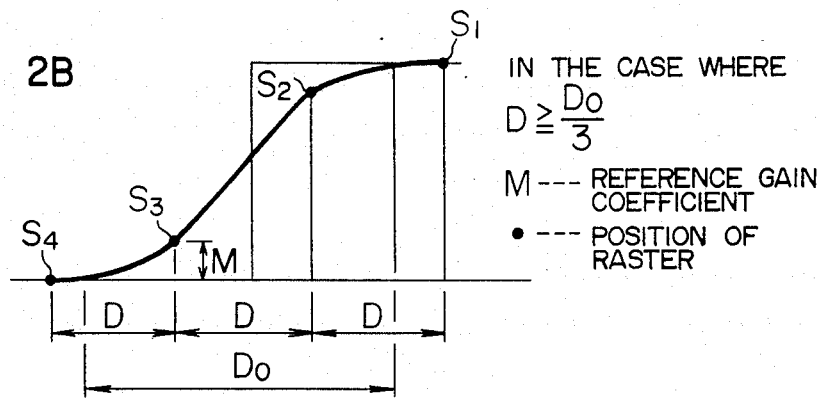
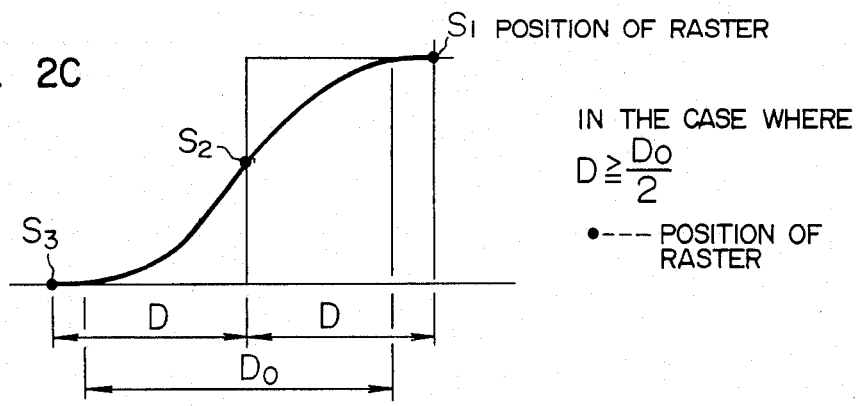

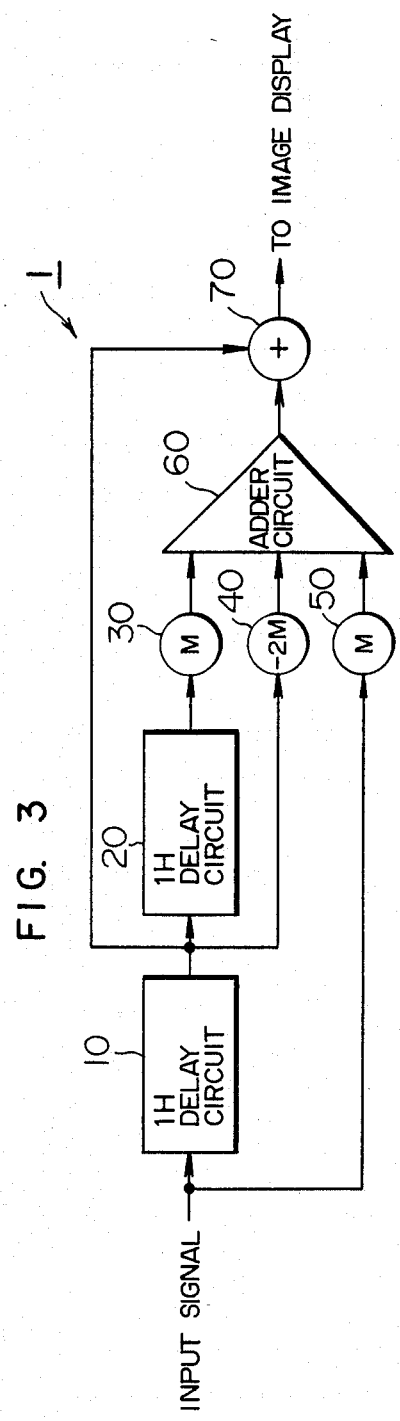
F I G. 3
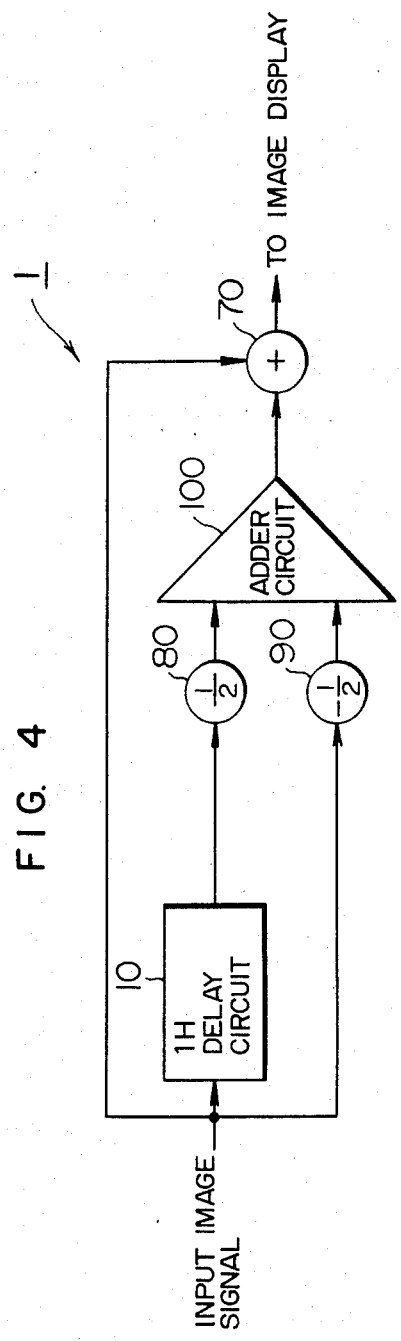
F I G. 4

SIGNAL PROCESSING FILTER FOR AN IMAGE PROJECTION DEVICE UTILIZING AN OIL FILM

BACKGROUND OF THE INVENTION

This invention relates to a projection type image display device utilizing an oil film including a rotating concave mirror, to the surface of which an oil film is applied, and a schlieren optical system, and in particular to an image display device including an elimination circuit, which prevents spurious images from being displayed.

Heretofore, in a projection type image display device utilizing an oil film, the cause of the spurious image signal generation at a variation point of the brightness of the image signal in the vertical direction has not been elucidated yet and no image corrections for eliminating the spurious image signal have been effected.

Further a representative example of the projection type image display device utilizing an oil film is called eyedhole and is known as one of the light bulb projection devices. (cf. Television Image Technique Handbook p. 194 and p. 1054, published by Ohm Publishing Co., 1980)

Here the principal cause of the spurious image signal generation at a variation point of the brightness of the image signal in the vertical direction in a projection type image display device utilizing an oil film will be described by referring to waveforms indicated schematically in FIGS. 1A to FIG. 1C.

FIG. 1A shows the level in the vertical direction of the input image signal $V_A$ with respect to the scanning line and FIG. 1B shows a recessed waveform $V_B$ of the surface of the oil film, depending on the vertical level indicated in FIG. 1A.

The light intensity is controlled, responding to the inclination angle of the oil film formed by this recessed waveform $V_B$. At this time, on the basis of the relation between the restoring force of the surface of the oil film when it is deformed and the interval to the succeeding scanning line the inclination angle of the oil film at the position of the n-th scanning line, which is the variation point of the brightness in the vertical direction (point where the brightness varies from its low level to its high level), becomes greater than its suitable value. For this reason a spurious image signal $V_C$ is produced, as indicated in FIG. 1(C).

The generation of this spurious image signal occurs more remarkably in particular with decreasing interval between scanning lines adjacent to each other on the surface of the oil film. Since the image scanning area on the oil film should be reduced, in other to display hyperfine images (hivision), for which the number of scanning lines per 1 frame is increased, which has been developed, or to reduce the size of a projection type image display device, which is the object of this invention, the interval between two scanning lines adjacent to each other becomes small. For this reason the generation of the spurious image signal increases. Therefore it becomes necessary and inevitable to eliminate this spurious image signal.

SUMMARY OF THE INVENTION

The object of this invention is to provide a projecting type image display device utilizing an oil film, enabling the prevention of the generation of the spurious image, even in the case where the number of scanning lines for the image signal is increased or the device is made smaller, which device has been developed in order to resolve the problems described above.

In order to achieve this object, a device according to this invention is characterized in that it comprises filter circuit having frequency characteristics enabling reduction the spatial frequency response in the vertical direction for an input signal having a stepwise waveform in the vertical direction to a value under those obtained by using the following formula with respect to the coordinate x of the position of the scanning line in the vertical direction;

$$f(x) = \frac{1 + \sin(\pi \cdot x/D_0)}{2}$$

where $D_0$ represents the smallest scanning line interval, outside of which adjacent scanning lines have no influences thereon, and filtering the input image signal according to those characteristics.

According to this invention the spatial frequency response in the vertical direction of the input image signal is reduced by a suitable amount so that the generation of the spurious image due to influences of close scanning line signals is prevented.

A projection type image display device utilizing an oil film according to this invention, comprising a rotating concave mirror to the surface of which an oil film is applied, and a schlieren optical system, enables suitable elimination of spurious images generated when the number of scanning lines per 1 frame is increased in order to be used for displaying hyperfine images.

Furthermore this invention enables easy reduction of the size of the projection type image display device utilizing an oil film, whose area for scanning the image is reduced, without deteriorating the image quality.

BRIEF DESCRIPTION OF THE DRAWINGS

FIGS. 1A, 1B and 1C are schemes for explaining the cause of the spurious image generation in a prior art projection type image display device utilizing an oil film;

FIGS. 2A, 2B and 2C are schemes for explaining the principle of a filter for eliminating spurious images according to this invention;

FIG. 3 is a block diagram illustrating the construction of an embodiment of this invention; and FIG. 4 is a block diagram illustrating the construction of another embodiment of this invention.

DESCRIPTION OF THE PREFERRED EMBODIMENTS

Some embodiments of this invention will be explained below more in detail, referring to FIGS. 2A to 4.

FIGS. 2A to 2C are schemes for explaining the principle to determine the gain coefficient of a filter circuit in a device according to this invention for preventing spurious images.

In FIGS. 2A to 2C, $D_0$ indicates the smallest interval of scanning lines, outside of which the inclination angle of the oil film is not influenced by close scanning lines (raster). From an experiment by using a hyperfine image display device, as an example, the smallest scanning line interval of about 0.27 mm is obtained and by another image display a value of about 0.21 mm is obtained. D represents the scanning line (raster) interval; $S_1$–$S_4$ the position of the scanning lines (raster); and M the reference gain factor.

FIG. 2A shows a limit characteristic curve for suppressing influences of the raster, which is within the interval of D in order to eliminate spurious images.

This characteristic curve can be represented by the following equation, which is a function of the coordinate x (millimeter) of the position of the scanning line in the vertical direction measured from the rising position of a stepwise waveform;

$$f(x) = \frac{1 + \sin\left(\pi \frac{x}{D_0}\right)}{2} \quad (1)$$

In the case where the scanning line interval D is not smaller than $D_0/3$ ($D \geq D_0/3$), as indicated in FIG. 2B, 2 rasters $S_2$ and $S_3$ adjacent to each other exist in the interval $D_0$ and suppress the spatial frequency response of the input image signal in the vertical direction to a value smaller than that indicated by the limit characteristics.

The signal suppressing treatment in this case can be effected by using a transversal filter (described later) using interference among image signals of 3 scanning lines.

In this case the reference gain factor for determining the coefficient, which should be multiplied with signals in 3 scanning lines, can be calculated by using the following equation, in which x in Eq. (1) is replaced by $-D/2$;

$$M = \frac{1 - \sin(\pi/2D_0 \cdot D)}{2} \quad (2)$$

A signal for reducing the spatial frequency response in the vertical direction is obtained by adding the upper and the lower rasters advanced and delayed, respectively, by the one horizontal scanning period (1H) and multiplied by M indicated above to the center raster multiplied by $-2M$, using 3 scanning lines (rasters) adjacent to each other by means of two 1H-delay circuits.

Here, supposing that D is equal to $D_0/3$, the value of M is $\frac{1}{4}$ by using Eq. (2).

FIG. 2C indicates the arrangement of the rasters $S_1$ to $S_3$ in the case where the scanning line interval D within a field is not smaller than $D_0/2$.

That is, in this case, only one adjacent raster $S_2$ exists within the interval $D_0$. Consequently, in this case also, in order to eliminate influences of the adjacent raster, the spatial frequency response of the input image signal in the vertical direction is suppressed to a value under that indicated by the limit characteristics.

The signal suppressing treatment in this case can be effected by using a 1H-delay circuit and a transversal filter (described later) using interference between image signals of 2 scanning lines and the signal for reducing the spatial frequency response in the vertical direction is obtained by adding a 1H delayed image signal and an image signal not delayed, multiplied by $+\frac{1}{2}$ and by $-\frac{1}{2}$, respectively.

This corresponds to the fact that the raster is positioned at the center of the limit characteristic curve indicated in FIG. 2A.

A concrete embodiment of this invention will be described below more in detail, referring to FIGS. 3 and 4.

FIG. 3 is a block diagram illustrating the construction of a spurious image signal eliminating filter circuit 1 used in a device according to this invention.

In FIG. 3 reference numerals 10 and 20 represent delay circuits delaying image signals by one horizontal scanning period (1H), respectively, which take out 3 image signals adjacent to each other in the vertical direction.

30, 40 and 50 are coefficient multipliers. The coefficient multiplier 40 multiplies the gain for the 1H delayed image signal by $-2M$; the coefficient multiplier 30 multiplies the gain for the 2H delayed image signal by M; and the coefficient multiplier 50 multiplies the gain for the image signal not delayed by M.

60 and 70 represent adders. The adder 60 adds the outputs of the coefficient multipliers 30, 40 and 50 and outputs the sum thereof. The adder 70 adds the output of the adder 60 to the signal which is the output of the delay circuit 10.

Hereinbelow will be described a case where the spurious image signal eliminating filter circuit stated in the above embodiment is applied to a hivision device, in which an oil film surface 46.3 mm long in the vertical direction is scanned with 1045 effective scanning lines for an image signal of the 2:1 interlace system, for which the scanning lines per one frame is 1125.

The input image signal is delayed by the delay circuit 10 by one scanning line (1H) and by the delay circuits 10 and 20 by two scanning lines (2H) and each of the delayed signals is taken out. The coefficient multiplier 50 multiplies the image signal not delayed by M; the coefficient multiplier 40 multiplies the image signal delayed by 1H by $-2M$; and the coefficient multiplier 30 multiplies the image delayed by 2H by M. The adder 60 outputs the sum of the 3 image signals outputted by these 3 coefficient multipliers.

Furthermore the adder 70 adds the output of the adder 60 to the signal which is the output of the delay circuit 10. In this way, a signal, for which the spatial frequency response in the vertical direction is reduced, is taken out.

FIG. 4 is a block diagram illustrating the construction of another filter circuit according to this invention.

Now will be described a case where the spurious image signal eliminating filter circuit indicated in FIG. 4 is applied to a display device, in which an oil film surface 46.3 mm long in the vertical direction is scanned with 483 effective scanning lines for an image signal of 2:1 interlace system, for which the scanning lines per one frame is 525.

The filter circuit for preventing the spurious image signal generation is used for the case where only one adjacent raster exists within the interval $D_0$, as indicated in FIG. 2C.

In FIG. 4 reference numerals identical to those in FIG. 3 represent same or corresponding items.

Reference numeral 80 and 90 are coefficient multipliers. The coefficient multiplier 80 multiplies the image signal delayed by 1H by a coefficient $\frac{1}{2}$ and the coefficient multiplier 90 multiplies the image signal not delayed by $-\frac{1}{2}$.

100 indicates an adder and the adder 100 adds the multiplied image signals from the coefficient multipliers 80 and 90.

The input image signal is, on one side, applied to the delay circuit 10, delayed by 1H and multiplied by the coefficient $\frac{1}{2}$ by the coefficient multiplier 80. On the other side, the input image signal is applied directly to the coefficient multiplier 90 and multiplied by the coefficient $-\frac{1}{2}$.

The adder circuit 100 adds the image signals multiplied respectively by the coefficient multipliers 80 and 90. The adder 70 adds the added output of the adder circuit 100 and the input image signal and supplies an image signal, whose spatial frequency response in the vertical direction is reduced, to the image display.

Although a circuit construction, whose spatial frequency response in the vertical direction is fitted for the limit characteristics indicated in FIG. 2A, is shown in the above embodiments this invention is not restricted to these embodiments.

That is, it is apparent that the spatial frequency response in the vertical direction is reduced to a value under the limit characteristics indicated in FIG. 2A by setting the value of M to be greater than that of Eq. (2), in the embodiment indicated in FIG. 3, so that the effect of this invention can be obtained. However an excessive reduction of the response stated above gives rise to deterioration of the image quality due to the lowering in the resolving power in the vertical direction, which is not desirable.

Furthermore the filter circuit according to this invention is not restricted to those indicated in the embodiments, but it is a matter of course that any filter circuit or element of other type having desired characteristics can be used.

What we claim:

1. A signal processing filter for an image projection device utilizing an oil film in which a vertical direction response waveform relative to a vertical direction stepwise waveform input image signal has an incline at least one of equal to and smaller than an incline of a tangent line of the function $$f(x) = [1 + \sin(\pi \cdot x/D_0)]2$$

at $x=0$, which is satisfied within a range of $-D_0/2 < X < +D_0/2$, where X represents a vertical direction scanning line position of the image projection device and $D_0$ represents a minimum scanning line interval of the image projection device which is free from an influence derived from adjacent scanning lines.

2. A signal processing filter according to claim 1, wherein $D_0$ has a value between 0.2 and 0.3 mm.

3. A signal processing filter according to claim 1, further comprising:

first and second 1H delay circuits connected in series, said first delay circuit receiving the input image signal;

a first coefficient multiplier circuit multiplying the input image signal by a first coefficient;

a second coefficient multiplier circuit multiplying the signal delayed by one 1H by said first delay circuit by a second coefficient;

a third coefficient multiplier circuit multiplying the signal delayed by 2H by said first and second delay circuits by a third coefficient;

a first adder circuit adding image signals multiplied by said first, second and third coefficients by said first, second and third coefficient multiplier circuits, respectively; and a second adder circuit adding the added signals from said first adder circuit to the signal delayed by 1H by said first delay circuit to provide an output image signal having spurious image signals eliminated.

4. A signal processing filter according to claim 1, further comprising:

a 1H delay circuit to which the input image signal is applied;

a first coefficient multiplier circuit multiplying the signal delayed by 1H by said delay circuit by a first coefficient;

a second coefficient multiplier circuit multiplying the input image signal by a second coefficient;

a first adder circuit adding signals multiplied by said first and second coefficients by said first and second coefficient multiplier circuits, respectively; and a second adder circuit adding the added signals from said first adder circuit to the input image signal so as to provide an output image signal having spurious image signals eliminated.

* * * * *